Oct. 5, 1943. J. G. O'NEIL ET AL 2,330,840
CONTAINER
Filed May 10, 1940 3 Sheets-Sheet 1

Inventors
JOHN G. O'NEIL
LAWRENCE G. ZESBAUGH
By Chas. E. Reif
Attorney

Oct. 5, 1943.   J. G. O'NEIL ET AL   2,330,840
CONTAINER
Filed May 10, 1940   3 Sheets-Sheet 2

Inventors
JOHN G. O'NEIL
LAWRENCE G. ZESBAUGH
By Chas C. Rey
Attorney

Oct. 5, 1943.   J. G. O'NEIL ET AL   2,330,840
CONTAINER
Filed May 10, 1940   3 Sheets-Sheet 3

Inventors
JOHN G. O'NEIL
LAWRENCE G. ZESBAUGH
By Chas. C. Reif.
Attorney

Patented Oct. 5, 1943

2,330,840

UNITED STATES PATENT OFFICE 2,330,840

CONTAINER

John G. O'Neil, Faribault, and Lawrence G. Zesbaugh, Minneapolis, Minn., assignors, by direct and mesne assignments, of one-half to Carl Weinhagen, Jr., St. Paul, Minn.

Application May 10, 1940, Serial No. 334,384

6 Claims. (Cl. 229—5.5)

This invention relates to a container and particularly to a container made of paper. While the invention might be applicable to various types of containers, in the embodiment of the invention illustrated it is embodied in a tubular container.

With the increasing dispensing of liquids including milk, powders and other substances in containers, it is desirable to have a simple and inexpensive form of container in which liquids and other substances may be packed and dispensed, which container should be of rugged and strong structure.

It is an object of this invention to provide a simple, efficient and easily constructed paper container which can be used to contain various liquids and solids.

It is a further object of the invention to provide a simple and efficient structure of paper container having a wide mouth, which container is reinforced adjacent its top and comprises a plurality of contacting layers.

It is a further object of the invention to provide a container such as set forth in the preceding paragraph, the same having the upper marginal portions thereof folded inwardly.

It is also an object of this invention to provide a simple and efficient paper container having a plurality of contacting layers, a bottom member disposed in said container having a downwardly directed flange, the said layers having their lower marginal portions folded inwardly and at least one of them being folded over said flange.

It is a further object of the invention to provide a novel method of forming a container.

It is still another object of the invention to provide a novel and simple blank for a container.

It is also an object of the invention to provide a simple, novel and efficient top closure for a container.

These and other objects and advantages of the invention will be fully set forth in the following description made in connection with the accompanying drawings in which like reference characters refer to similar parts throughout the several views and in which.

Figure 1:
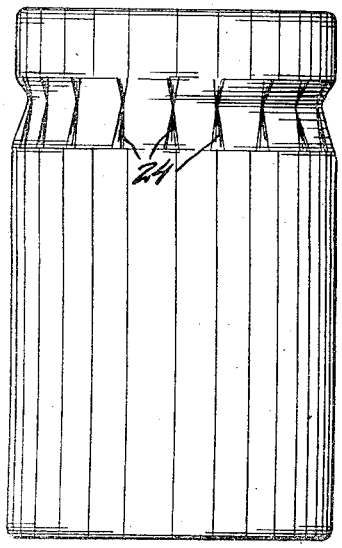
Fig. 1 is a view in elevation showing the exterior of the container.
Figure 2:
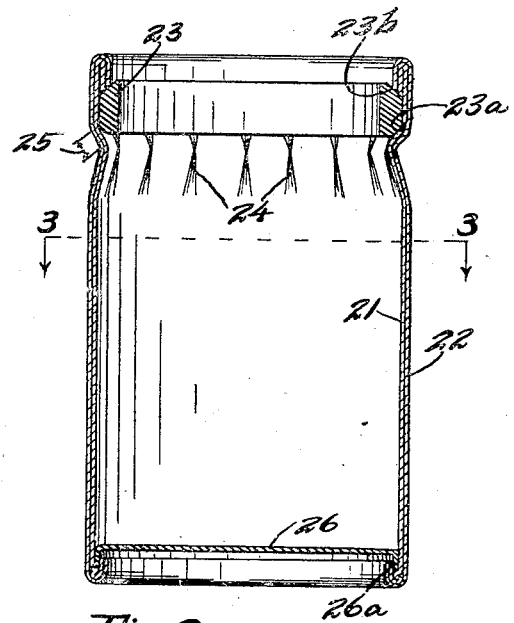
Fig. 2 is a central vertical section through the container.
Figure 3:
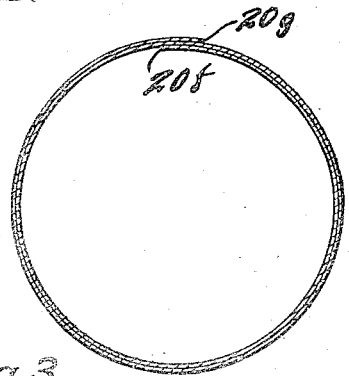
Fig. 3 is a horizontal section taken on line 3—3 of Fig. 2 as indicated by the arrows.
Figure 4:
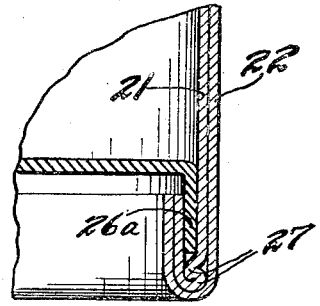
Fig. 4 is a partial section similar to Fig. 2 shown on an enlarged scale.
Figure 5:
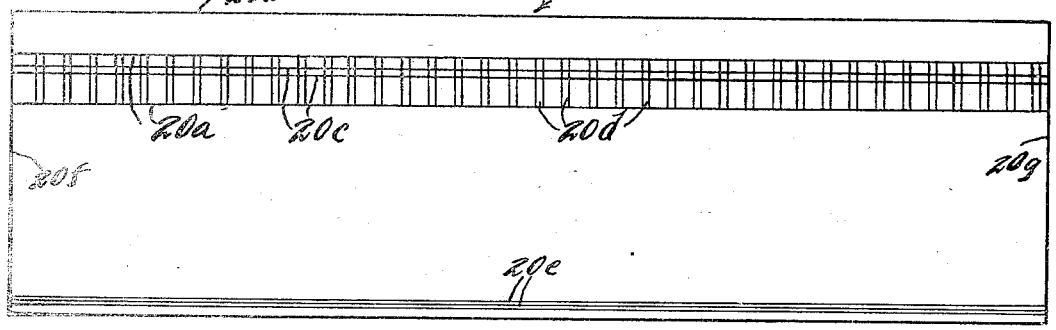
Fig. 5 is a plan view of the blank used to make the container shown in Figs. 1 to 4.
Figure 6:
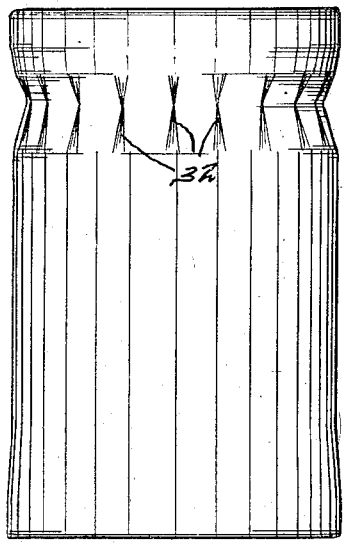
Fig. 6 is a view similar to Fig. 1 showing a modification.

Referring to Figs. 1 to 5, a container is shown which is preferably made from a blank such as shown in Fig. 5. As shown said blank comprises a sheet of material 20 of elongated rectangular form which in practice has been made of paper. When made from paper the stock will be suitably treated to render it suitable for the substance which the container is intended to hold. If the container is to hold liquid, such as milk, the paper stock will be treated to render it waterproof. Similarly the stock could be treated to render it oil or greaseproof if the container is intended to hold lubricating oil, grease or similar substances. The blank 20 is provided with longitudinally extending scores 20a which extend in spaced parallel relation and parallel to the top edge 20b of said blank. Between the scores 20a the blank is provided with a pair of scores 20c. The upper of these is spaced a short distance from the upper score 20a and said scores 20c are spaced a short distance apart, which distance is substantially the same as that between the upper score 20c and the upper score 20a. Between the scores 20a the blank is provided with a plurality of pairs of scores 20d, the scores of said pairs being slightly separated and the pairs being separated a somewhat larger distance. Adjacent its lower longitudinal edge blank 20 is also provided with a plurality of scores 20e extending in slightly spaced parallel relation and parallel to the longitudinal edge of said blank. Scores 20e are preferably three in number. The various scores can be made by any suitable tool which will make a fine crease in the paper stock. While the container could be variously formed, in practice one method has been to wind blank 20 upon a mandrel to form the tubular body of the container, said container being thus formed with an inner layer 21 and an outer layer 22. As shown in Fig. 3 the end edges 20f and 20g of the blank are spaced a short distance circumferentially of the formed body so that the inner and outer layers overlap the distance between said edges. The marginal portions of the blank adjacent edges 20f and 20g will be firmly secured in the tubular body by suitable adhesive. A strengthening ring 23 is provided and this will be made of paper-like material and will be substantially rigid. Said ring 23 is placed in position on the mandrel and the blank wound very tightly around it. The surface of the ring is covered with adhesive and it will be firmly secured to inner layer 21 by said adhesive. The lower edge of said ring will be positioned so that it alines substantially with the top score 20a. The body of the tubular container is now contracted below ring 23. This is done by placing it in a press or other surrounding member which can be forced inwardly. The contracting operation results in the formation of a plurality of crimps 24 which form as the result of the vertical scores 20d. These crimps, particularly at their central portions, are in effect very small folds in the material. The portion between scores 20c forms an outwardly and upwardly extending zone or portion 25. The crimps 24 merge into the cylindrical surface of the container above this zone and below this zone. The crimps 24 are of the same height as the scores 20d. The merging portion of the crimps at the top is much shorter than at the bottom and as shown in Fig. 2 the crimps 24 are of considerable length below the zone 25. The lower corner of ring 23 may be beveled as shown at 23a to fit against the upwardly and outwardly extending portion 25. It will be seen that portion or zone 25 forms a shoulder against which ring 23 seats. The central part of the ring is cylindrical and fits about the cylindrical upper portion of the container above crimps 24. The upper and outer corner of the ring is beveled as shown at 23b. The upper marginal portions of the inner and outer layers 21 and 22 are rolled or crimped inwardly by suitable apparatus to form a fold with the layers thereof in contact. The upper edges of inner and outer layers 21 and 22 which are not in horizontal alinement are disposed between the beveled portion 23b and the inner layer 21, said edges thus being below the top edge of ring 23. The container thus has a four layer thickness at its top portion. This with the ring 23 and the crimped portion formed by the crimps 24 give the container an exceedingly firm and strong structure.

A bottom member 26 is provided, the same being shown as of cup form and having a downwardly extending cylindrical flange 26a engaging inner layer 21. Flange 26a will be firmly secured to inner layer 21 by suitable adhesive. The inner and outer layers 21 and 22 below flange 26a are folded inwardly. This folding operation forms small folds 27 in the inner layer 21 due to the scores 20e and due to the fact that the layers are adhesively connected and thus in effect integral. Due to the folds 27 the lower edges of layers 21 and 22 come into horizontal alinement at the inner side of flange 26a. Were it not for the folds 27 the bond between layers 22 and 21 would be broken and the edge of the outer layer 22 would be below the edge of the inner layer due to the fact that the outer layer must be folded about a larger radius than the inner layer. A folding over operation rather than a crimping operation is used to avoid disturbing the adhesive bond between layers 21 and 22. The container is thus completely formed. The container is waxed before use, particularly when used for liquids and the wax will fill the portion between bevel 23b and the inner wall 21 which is not occupied by the ends of the folded marginal portions. The said ends are thus completely covered and obscured and there is no chance of anything catching on said ends or edges.

Figure 7:
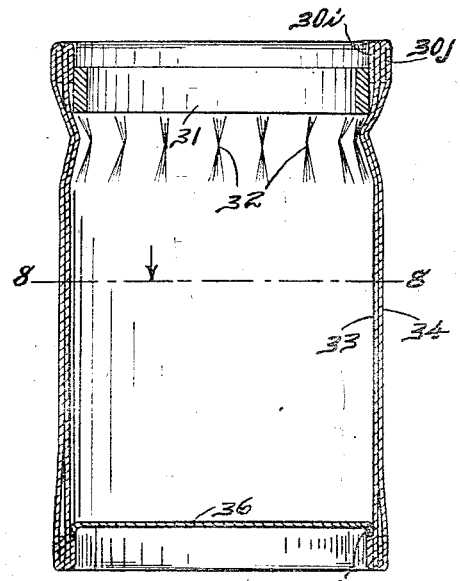
Fig. 7 is a central vertical section of the container shown in Fig. 6.
Figure 8:
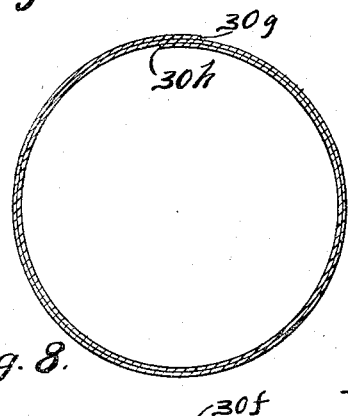
Fig. 8 is a horizontal section taken on the line 8—8 of Fig. 7 as indicated by the arrow.
Figures 9, 10:
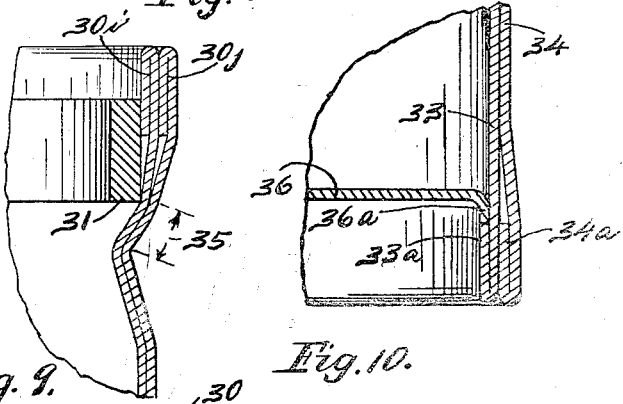
Fig. 9 is a partial section similar to Fig. 7 showing the upper portion of the container on an enlarged scale.
Fig. 10 is a partial view similar to Fig. 7 showing the lower portion of the container on an enlarged scale.
Figure 11:
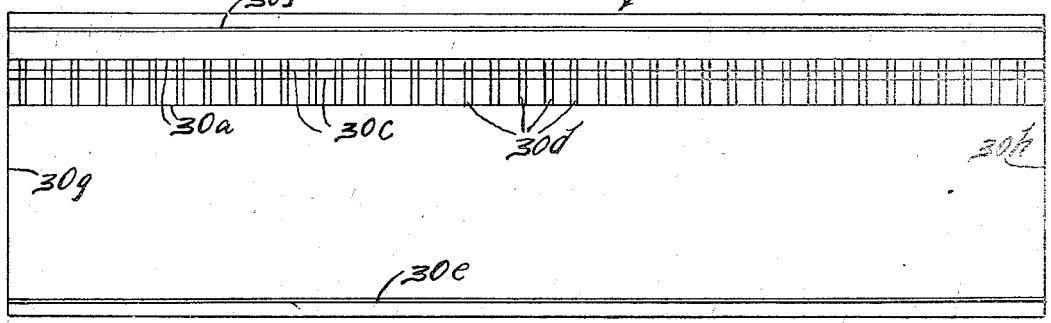
Fig. 11 is a plan view of the blank used to make the container shown in Figs. 6 to 10.
Figure 12:
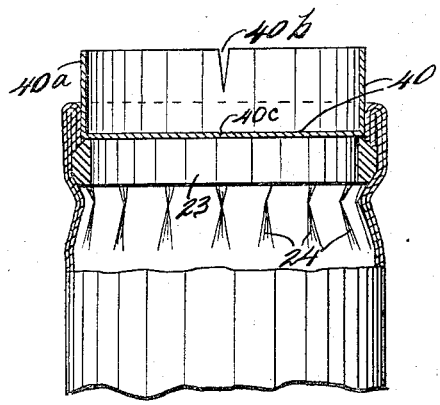
Fig. 12 is a view partly in side elevation and partly in vertical section of the container showing a cover applied thereto.

Referring to Figs. 6 to 11 another form of container is shown. A blank 30 is used of substantially the same shape as that shown in Fig. 5. Blank 30 will be provided with scores 30a similar to the scores 20a of blank 20 and will also be provided with scores 30c similar to scores 20c already described. Blank 30 will also have the spaced pairs of vertical scores 30d extending between scores 30a and these scores 30d are similar to the scores 20d in blank 20. Blank 30 will also have slightly spaced scores 30e extending in parallel relation and parallel and closely adjacent the lower longitudinal edge of the blank. Scores 30e are preferably two in number. Blank 30 has similar scores 30f extending in slightly spaced parallel relation parallel to and spaced a short distance from the upper longitudinal edge of blank 30. The first operation is to fold the longitudinal edge portions of blank 30 inwardly. A strengthening ring 31, preferably made of paper material and being substantially rigid, is provided. Said ring is shown as of substantially rectangular form in radial cross section. When the blank is wound upon the mandrel the folded over portions 30i and 30j at the top come into overlapping relation as separate folds as shown in Figs. 7 and 9. The ring 31 is placed in the container and will be secured therein by suitable adhesive. It will be understood that the end edge portions of the blank will also be secured in position in the tubular body by suitable adhesive. The adhesive securing ring 31 will largely fill the space between the same and the inner layer, which space is below the edge of the fold of the inner layer. The tubular body is now contracted below ring 31 as has already been described with the container shown in Figs. 1 to 4. This forms a plurality of crimps 32 in the inner layer 33 and the outer layer 34. The space between scores 30c forms an upwardly and outwardly extending zone 35 just below ring 31. The crimps 32 run out into the cylindrical form of the container above zone 35 and they run out in a much longer distance below zone 35, the same merging into the lower cylindrical portion of the container at the lower ends of the scores 30d. Portion or zone 35 thus forms a shoulder against which ring 31 seats.

A bottom member 36 is provided of general cup shape, the same having a downwardly directed flange 36a of cylindrical form which fits against inner layer 33 and will be firmly secured thereto by adhesive. When the blank was rolled into tubular form the folded lower portion provided a fold 33a at the inner side of the bottom portion and a fold 34a at the outer side of said bottom portion. It may be stated that the folds at the upper and lower marginal portions of the blank which form folds 30*l*, 30*j*, 33*a* and 34*a* will be firmly secured by suitable adhesive. That is, the folded over portion will be so secured. It may be mentioned that the inner and outer layers of the container, both layers 21 and 22 shown in Figs. 1 to 4 and layers 33 and 34 shown in Figs. 6 to 10 will be firmly secured together by adhesive. It will be noted as shown in Fig. 10 that the inner edge of the inner layer or of fold 33*a* forms a shoulder against which the edge of flange 36*a* engages.

The bottle is now completely formed. It will be seen that the bottle or container shown in Figs. 6 to 10 also has a four layers thickness at its top and this together with the rigid ring 31 and the crimped portion formed by crimps 32 will give a very strong and rugged structure at the top portion of the container. In both forms of the container described there is also four thicknesses at the bottom of the container. These cooperating with the bottom member give a very strong and rugged structure at the bottom portion of the container. The bottom proper is spaced from the lower and supporting edge of the container.

Figure 13:
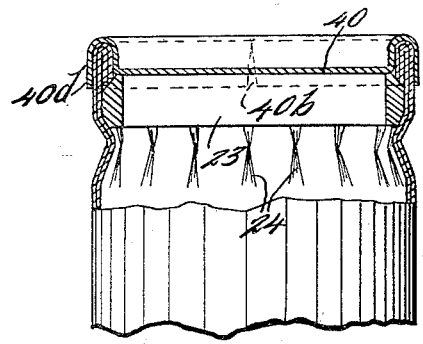
Fig. 13 is a view similar to Fig. 12 showing the cover in completed condition.
Figure 14:
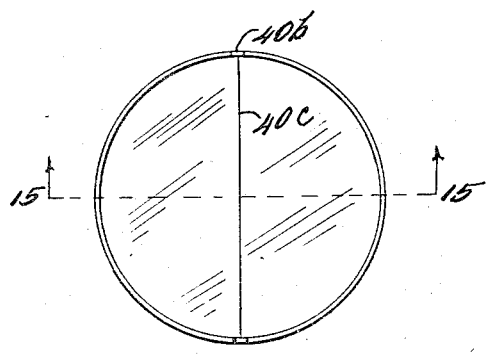
Fig. 14 is a top plan view of the cover in the form shown in Fig. 12.
Figure 15:
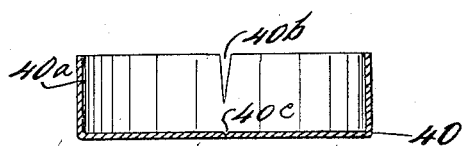
Fig. 15 is a vertical section taken on line 15—15 of Fig. 14 as indicated by the arrows.
Figure 16:
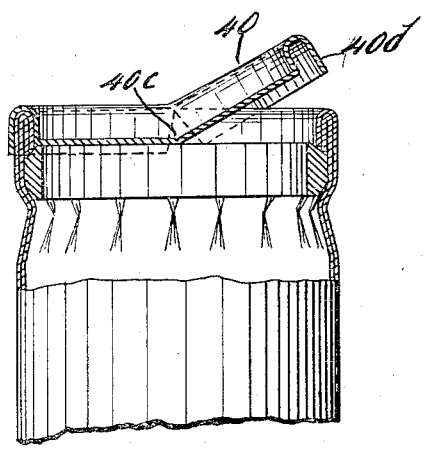
Fig. 16 is a view similar to Fig. 13 illustrating how the cover is lifted.

A suitable top or closure member will be provided, one form of which is illustrated in Figs. 12 to 16. This cover 40 is of general cup shape having a cylindrical portion or flange 40*a*. Flange 40*a* will have V-shaped notches 40*b* cut in opposite sides thereof and the circular part of the cover within flange 40*a* will be provided with a score 40*c* extending diametrically thereof between the notches 40*b*. The cover 40 will be of a diameter to fit snugly within the upper portion of the container and will be forced therein with a suitable apparatus so as to seat on top of the ring 23 or the ring 31, whichever is used. After being so seated flange 40*a* will be rolled or spun over the outer layer of the container as shown in Fig. 13. The cover will be very firmly held in place in the position shown in Fig. 13. When it is desired to remove the cover the operator may insert the thumb nail or finger nail under the edge of the folded over portion 40*d* of flange 40*a*. The cover will swing upwardly about the score 40*c* as shown in Fig. 16. If one desires to pour out part of the contents of the bottle or to drink from the bottle this could be done by merely lifting half of the cover as shown in Fig. 16. Half of the cover merely lifts up and as stated pivots or hinges about score 40*c*. If desired the whole cover can then be lifted off. A very simple, efficient and convenient cover structure is thus provided.

From the above description it is seen that we have provided a very simple, novel, efficient and easily made container for liquids or other substances. The container is made from a simple blank and the completed container is very strong and rugged. It makes a very suitable and efficient container for dispensing milk. When used for the usual daily dispensing of liquid milk the container may be discarded after the milk has been used therefrom. The milk company is thus relieved of the necessity of collecting containers, such as the glass bottles, now used in many places. The great breakage loss is also eliminated. The present container can be produced at a price to effect a great saving over the use of glass bottles. The container is particularly constructed and arranged to have a plain dish cover which is now commonly used in glass milk bottles. The container has been amply demonstrated in actual practice and found to be very successful and efficient.

It will, of course, be understood that various changes may be made in the form, details and proportions of the container as well as the blank and in the steps and sequence of steps of the method without departing from applicants' invention, which generally stated, consists in a device, method and blank capable of carrying out the objects above set forth and such as described and defined in the appended claims.

What is claimed is:

1. A tubular container body comprising inner and outer contacting layers, a contracted portion adjacent the top of said body forming a shoulder, a substantially rigid ring within said body engaging the inner layer and seated against said shoulder, said ring having an inwardly beveled portion at its top, the upper marginal portions of said inner and outer layers being turned inwardly in one fold, the edges of said portions being disposed between said beveled portion and said inner layer.

2. A container comprising a rigid ring having an outer cylindrical periphery, a plurality of layers of flexible paper wound about said periphery to form a body, said body having a major portion below said ring with an internal diameter the same as the diameter of said periphery and being crimped immediately below said ring to form a contracted portion comprising a downwardly and inwardly extending bevelled shoulder engaged by the lower side of said ring.

3. A tubular container formed of an integral sheet of material wrapped to provide inner and outer contacting layers extending in cylindrical form, said container being of the same exterior diameter at its upper and lower portions and having a contracted portion adjacent its upper end forming a downwardly and inwardly extending shoulder, a rigid annular member in said container fitting against inner layer and seating against said shoulder, said member having its lower edge disposed about the lower portion of said shoulder.

4. A container comprising a tubular body portion having a contracted portion adjacent its upper end forming a shoulder, a rigid ring fitting in said body above said contracted portion and seated against said shoulder, said ring having a top annular surface and a cover engaging said surface and extending down around the outer side of said container, said cover having slits therein at opposite sides of its outer portions whereby one-half of the same can be lifted and bent about a diameter extending between said slits to remove said cover.

5. A container comprising a tubular body portion having a contracted portion adjacent its upper end forming a shoulder, a rigid ring fitting in said body above said contracted portion and seated against said shoulder, said ring having a top annular surface and a cover engaging said surface and extending down around the outer side of said container, said cover having slits therein at opposite sides of its outer portion and a scored groove extending between said slits whereby one-half of said cover can be lifted and bent about said groove to remove said cover.

6. A container formed of a sheet of stiff paper material having parallel edges and wrapped in superposed layers to form a cylinder, the axis of which extends at right angles to said edges, said container being of the same diameter at its top and bottom, a ring of stiff material and comparatively narrow width and having an appreciable thickness at its bottom seating against the inner side of said container adjacent the top thereof, the wall of said container being crimped to extend inwardly and downwardly to a line just below said ring and to a diameter smaller than the outer diameter of the bottom of said ring, thus forming a seat for said ring and then extending outwardly and downwardly for an appreciable distance to the full diameter of said container at its lower portion.

JOHN G. O'NEIL.
LAWRENCE G. ZESBAUGH.